March 16, 1965 D. C. WOODS 3,173,632
LANDING GEAR FOR HOVERING TYPE AIRCRAFT
Filed July 30, 1962 4 Sheets-Sheet 1
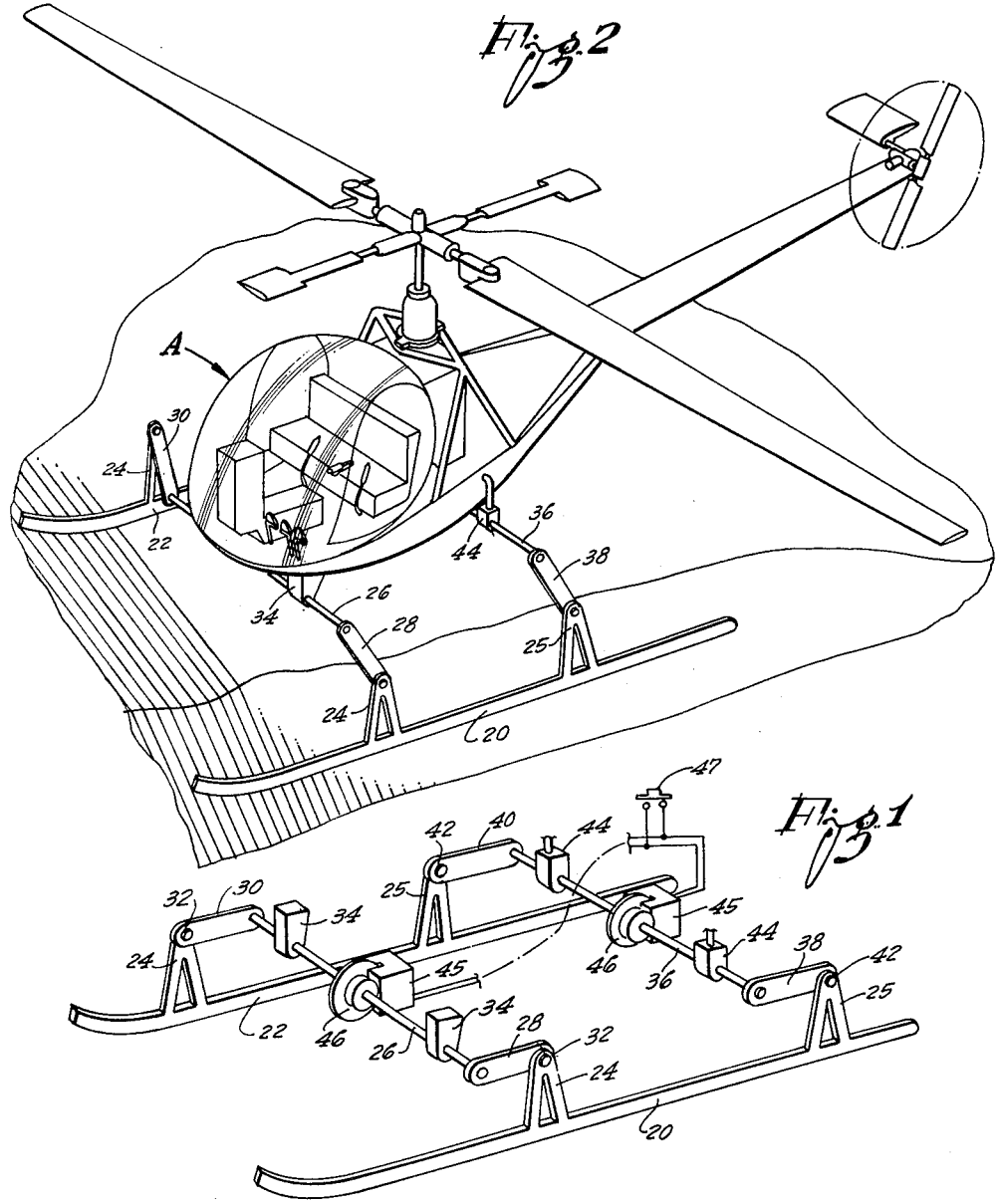
INVENTOR:
Donald C. Woods
Attorneys March 16, 1965 D. C. WOODS 3,173,632
LANDING GEAR FOR HOVERING TYPE AIRCRAFT
Filed July 30, 1962 4 Sheets-Sheet 2
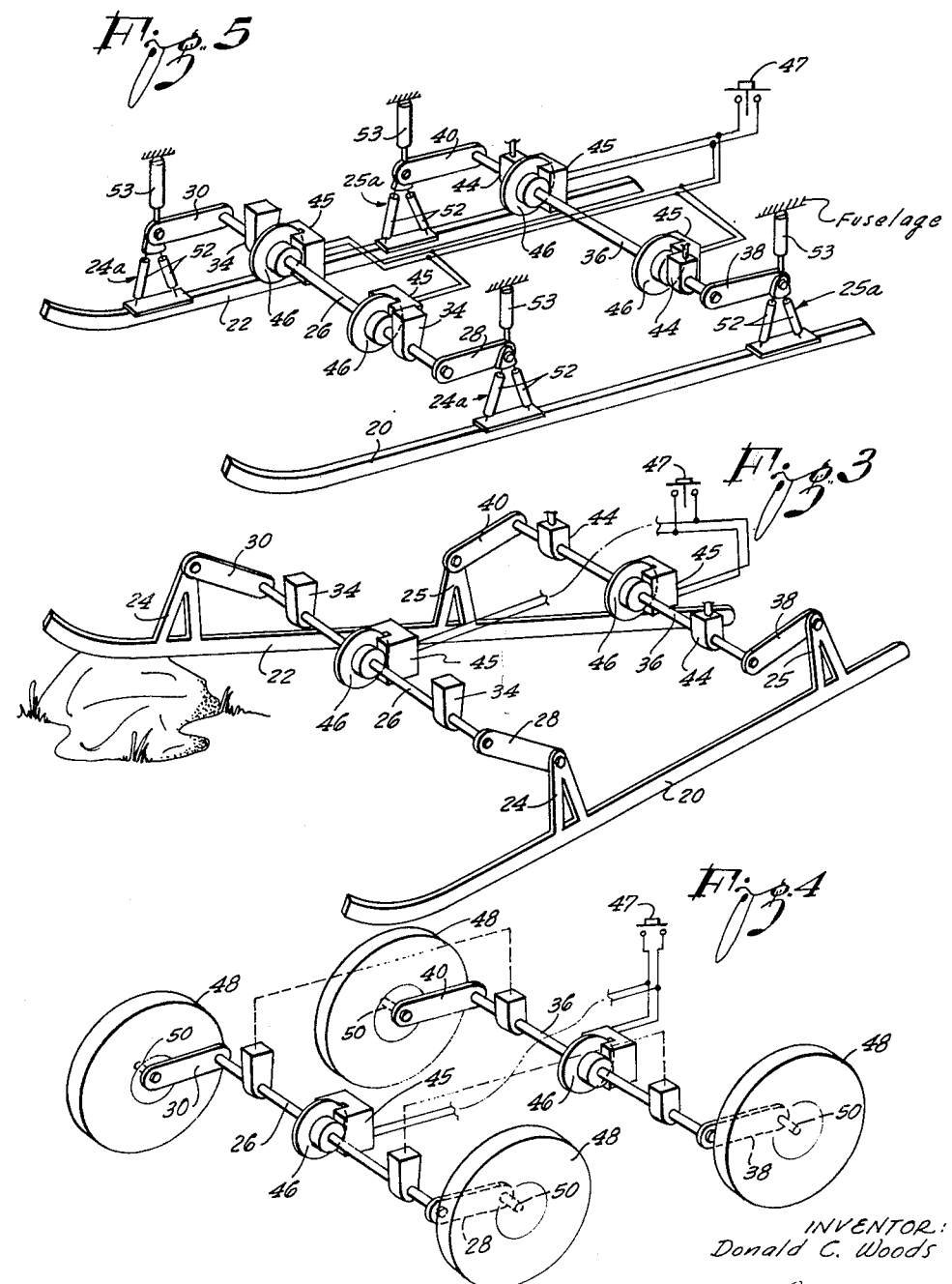

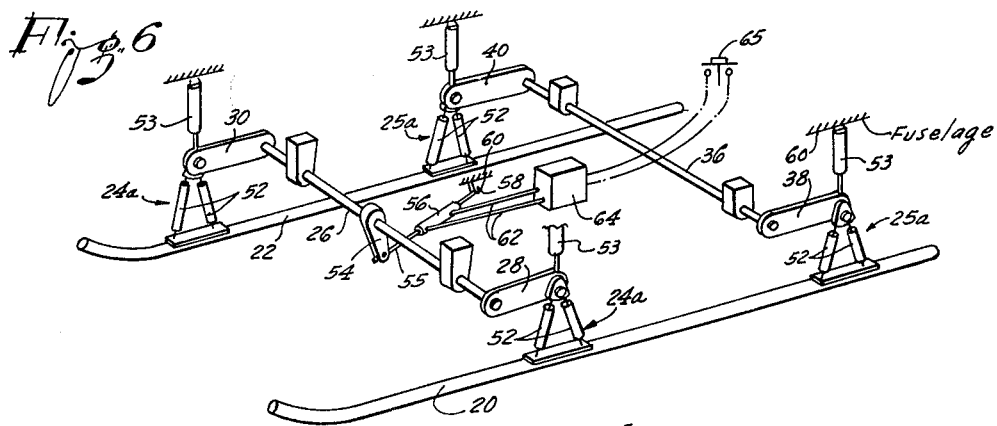
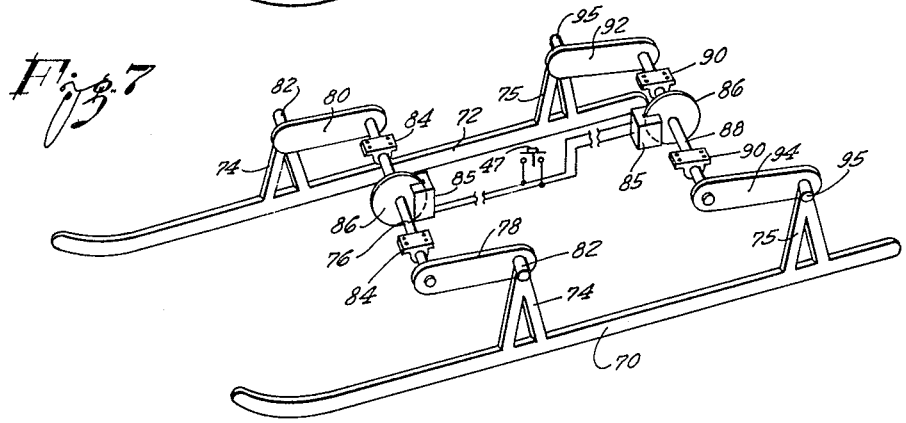
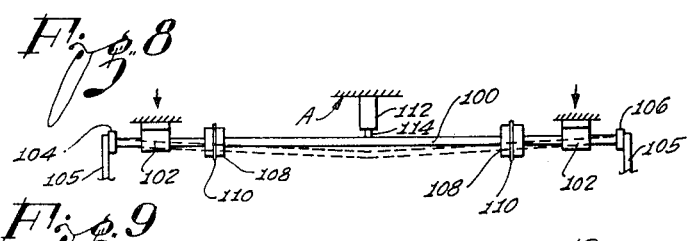
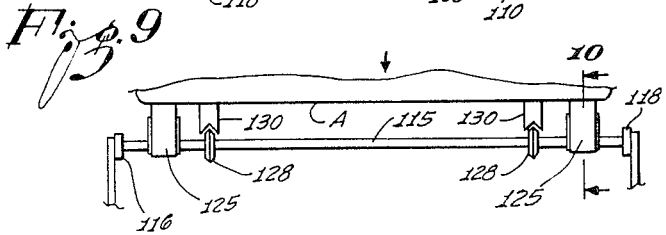
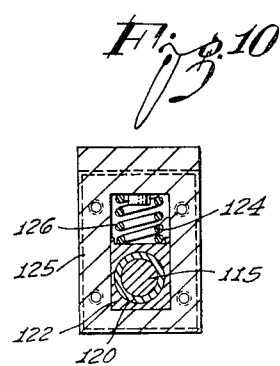

March 16, 1965       D. C. WOODS       3,173,632
LANDING GEAR FOR HOVERING TYPE AIRCRAFT
Filed July 30, 1962       4 Sheets-Sheet 4
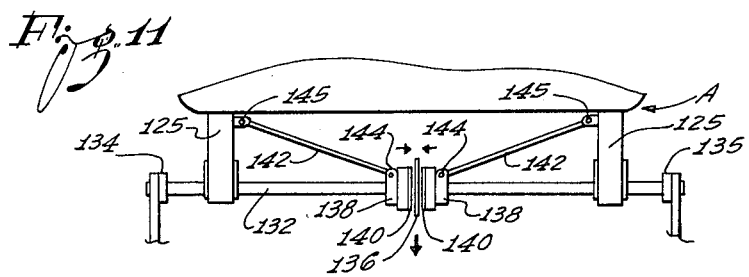
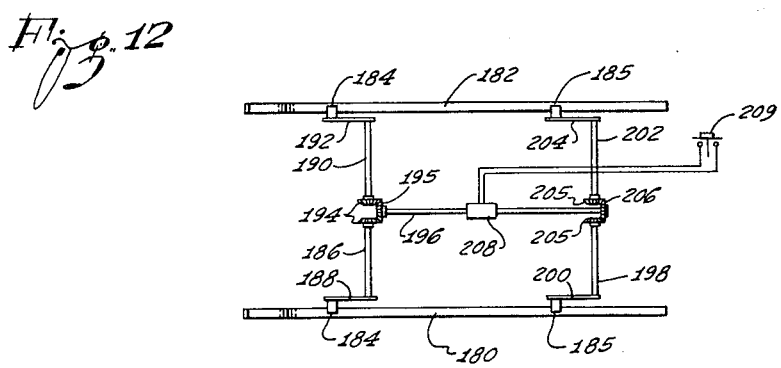
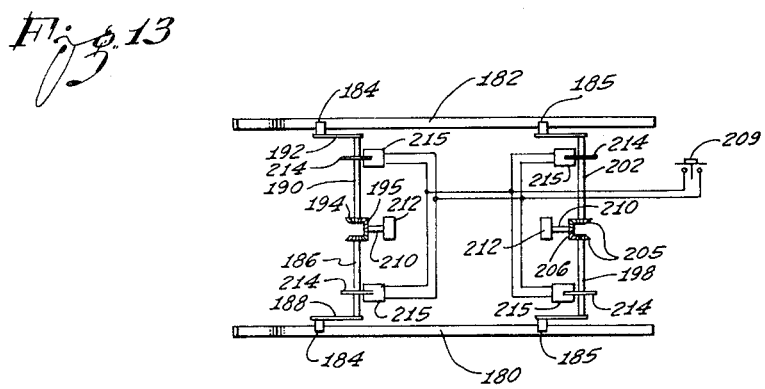
INVENTOR:
Donald C. Woods
By Smyth, Roston & Pavitt
Attorneys United States Patent Office 3,173,632
Patented Mar. 16, 1965

3,173,632
LANDING GEAR FOR HOVERING TYPE
AIRCRAFT
Donald C. Woods, Big Bear Lake, Calif., assignor to Del
Mar Engineering Laboratories, Los Angeles, Calif., a
corporation of California
Filed July 30, 1962, Ser. No. 213,221
12 Claims. (Cl. 244—100)

This invention relates to landing gear for a hovering type aircraft, for example a helicopter, and more particularly, relates to a landing gear for use on sloping ground or on rough ground, for example, ground strewn with rocks.

The usual landing gear of a helicopter is designed for takeoff and landing solely on a horizontal surface. When landing such a helicopter on laterally sloping ground the landing gear must be tilted out of horizontal to make supporting engagement with the ground and the helicopter fuselage must, of course, be correspondingly tilted out of horizontal. Unfortunately however, the fuselage of a helicopter cannot be tilted out of horizontal by any controlled maneuver without causing the helicopter to move simultaneously forward, backward or sideways. The situation may be met by guiding the rotor against the slope of the ground from the first moment of contact between the landing gear and the ground so that the pitching moment that is created by inclining the helicopter is compensated by corresponding inclination of the rotor until the landing is completed. Takeoff may be carried out in the same manner. This type of maneuver can be carried out effectively, however, only if the lateral slope of the ground is not greater than the maximum possible angle of inclination of the rotor, this maximum angle being between 6° to 8°. If the lateral slope of the ground is greater than 8° it is not feasible to attempt such a landing maneuver and especially so under unfavorable wind conditions.

To avoid these disadvantages, various types of landing gears have been developed that may be described as laterally tiltable. For example, such a landing gear may comprise two ground contact means on the opposite sides, respectively, of the aircraft adapted to be raised and lowered relative to each other as required to conform to the contour of the ground.

In a typical landing maneuver with such a prior art laterally tiltable landing gear, either the landing gear is tilted laterally by remote control in anticipation of the landing on uneven ground or the landing gear is tilted by remote control, usually by power means, after the landing gear touches the ground. In some instances the remote control is automatically adjusted in response to a pendulum that senses whether or not the aircraft is tilted away from the vertical.

The present invention simplifies the landing procedure by providing a freely tiltable landing gear in combination with means to immobilize the landing gear with respect to its tilt relative to the aircraft. By "freely tiltable" is meant a landing gear that is freely responsive to contact with the ground for tilt by the ground to conform with the ground configuration. The new landing procedure consists simply of lowering the aircraft gradually under power until the landing gear is correctly tilted by responsive contact with the ground and then locking the landing gear to cause the laterally tilted landing gear to hold the aircraft in vertically upright position.

In some practices of the invention the means to immobilize the landing gear with respect to tilt is under remote control by the pilot. In other practices the immobilization is automatic, being responsive to imposition of the weight of the aircraft on the landing gear.

A feature of the preferred practice of the invention is the concept of an exceedingly simple ground-responsive landing gear structure in which a transverse shaft or torsion rod journalled on the aircraft has oppositely directed crank arms at its opposite ends connected to two corresponding ground contact means on the two sides respectively of the aircraft. Thus when either of the two ground contact means is displaced upward by contact with the ground, the torsion rod is thereby rotated to cause corresponding downward movement of the other ground contact means. The two ground contact means may be immobilized by simply immobilizing the torsion rod against rotation.

In another practice of the invention two separate torsion rods are employed, each with one crank arm. The two crank arms extend in the same direction but the two torsion rods are interconnected by gearing for rotation in opposite respects so that upward swinging movement of one crank arm causes corresponding downward swinging movement of the other crank arm. The immobilizing means may act on one or both of the two torsion rods or may act solely on the interconnecting gearing.

The features and advantages of the invention may be understood from the following detailed description and the accompanying drawings.

In the drawings, which are to be regarded as merely illustrative:

FIG. 1 is a perspective view of an embodiment of the landing gear shown separate and apart from the hovering type aircraft on which it is used;

FIG. 2 is a perspective view of a helicopter equipped with the landing gear shown in FIG. 1, the landing gear supporting the aircraft upright on laterally sloping ground;

FIG. 3 is a view similar to FIG. 1 of the same embodiment of the invention illustrating the fact that the landing gear is capable of accommodating itself to unevenness in the ground contour caused by a single rock;

FIG. 4 is a perspective view of a landing gear similar to the landing gear shown in FIG. 1 with a pair of wheels substituted for a skid on each side of the aircraft;

FIG. 5 is a view similar to FIG. 1 showing an embodiment of the invention that incorporates shock absorbers;

FIG. 6 is a perspective view of an embodiment which employs hydraulic means to immobilize the landing gear relative to the aircraft;

FIG. 7 is a perspective view of an embodiment of the invention in which the two torsion rods are inclined away from perpendicular to the longitudinal axis of the aircraft for more uniform distribution of the weight to the two skids;

FIG. 8 is a fragmentary diagrammatic view showing how a switch may be actuated by flexure of a torsion rod for automatically immobilizing the landing gear in response to the imposition of the weight of the aircraft on the landing gear;

FIG. 9 is a similar diagrammatic view showing how the aircraft may be mounted on the landing gear with freedom for slight relative vertical movement between the aircraft and the landing gear and with the provision of immobilizing means that is operated by the relative vertical movement for automatically locking the landing gear in response to imposition of the weight of the aircraft on the landing gear;

FIG. 10 is a transverse sectional view taken along the line 10—10 of FIG. 9 and illustrating the means for providing the lost motion or slight relative vertical movement between the aircraft and the landing gear;

FIG. 11 is a somewhat diagrammatic view showing how brake means on a transverse torsion rod may be operated by toggle links in response to the imposition of the weight of the aircraft on the landing gear;

FIG. 12 is a plan view of a landing gear in which two torsion rods with crank arms directed in the same direction are interconnected by gearing for rotation in opposite directions, there being two interconnected sets of two such torsion rods under the control of a single immobilizing means; and FIG. 13 is a similar view of a construction similar to that shown in FIG. 12 in which two separate immobilizing means are provided for the two pairs respectively of the torsion rods.

FIG. 1 shows a selected embodiment of the landing gear of the invention and FIG. 2 shows the landing gear mounted on a hovering type aircraft, generally designated A in the form of a helicopter. FIG. 1 shows how the parts of the landing gear are positioned when supporting an aircraft on a level surface and FIG. 2 shows how the landing gear accommodates itself to a surface that slopes laterally of the aircraft.

The landing gear includes suitable ground contact means on its opposite sides which may take various forms in various practices of the invention. In the construction shown, the ground contact means comprises a left hand skid or runner 20 and a similar right hand skid or runner 22. It is contemplated that the weight of the aircraft will be imposed on a forward point and a rearward point on each of the two runners. For this purpose each runner has a rigid forward upstanding bracket 24 and a similar rearward bracket 25.

The means for transmitting the weight of the aircraft to the two forward brackets 24 of the two longitudinal skids, respectively, comprises a transverse shaft or torsion rod 26 and two oppositely directed crank arms rigidly fixed on the opposite ends of the torsion rod. The two crank arms comprise a left hand crank arm 28 which extends rearwardly and a right hand crank arm 30 which extends forwardly, each of the two crank arms being connected to the corresponding bracket 24 by a suitable pivot means 32. The transverse torsion rod 26 is suitably journalled on the underside of the aircraft, for example, by a pair of suitable bearings 34.

In like manner the means for transmitting the weight of the aircraft to the two rearward brackets 25 comprises a rearwardly located transverse shaft or torsion rod 36 together with a rearwardly directed left hand crank arm 38 and a forwardly directed right hand crank arm 40, the two crank arms being connected to the two brackets by suitable pivot means 42. The torsion rod 36 may be journalled in a pair of spaced bearings 44.

In accord with the teachings of the invention, suitable means is provided to releasably immobilize at least one of the two transverse torsion rods 26 and 36. In the construction shown in FIG. 1 a suitable brake means or locking means, generally designated 45 is provided for each of the two torsion rods but it is to be understood that either one of the two brake means may be omitted. Each of the two brake means 45 which may be of any well-known type is operable by remote control to releasably frictionally grip a corresponding disk 46 that is keyed to the corresponding torsion rod. Normally the two brake means are in mechanical engagement with the two disks but are electrically responsive to open in response to the closing of a normally open push button switch 47 which is conveniently located on one of the flight control sticks.

The manner in which the described landing gear functions for its purpose may be readily understood from an inspection of FIGS. 1 and 2. It is apparent that if either one of the two skids 20 or 22 is elevated from its position shown in FIG. 1 the two torsion rods and their associated cranks cause the other of the two skids to be correspondingly lowered. Thus when a helicopter equipped with the landing gear lands on terrain that slopes laterally of the aircraft the skid on the uphill side of the aircraft makes contact with the ground first and is thereby forced upward to cause corresponding lowering of the other skid on the downhill side of the aircraft. In FIG. 2, for example, the right hand skid 22 is forced upward to cause upward clockwise rotation of the two right hand cranks 30 and 40 and the consequent rotation of the two torsion rods 26 and 36 causes the two left hand cranks 28 and 38 to swing downward by the same amount.

To land the aircraft in the position shown in FIG. 2, the pilot merely lowers the aircraft in level position while pressing the push button switch 47 to release the two brake means. When the right hand skid touches the ground and is forced upward the left hand skid is correspondingly forced downward. The pilot manipulates the controls to keep the aircraft upright until both skids are firmly placed on the ground and then releases the push button switch 47 to actuate the two brake means 45 to immobilize the two torsion rods.

FIG. 3 illustrates the fact that the described landing gear will accommodate itself to terrain which inclines one of the two skids 20 and 22 relative to the other. In FIG. 3 the front end of the right hand skid 22 is shown elevated by a rock. It is apparent that immobilization of the forward torsion rod 26 by either or both of the two brake means 45 will enable the landing gear to support the full weight of an aircraft in a stable manner.

FIG. 4 shows how the described landing gear may be modified by substituting a pair of ground wheels 48 for each of the two skids 20 and 22. Each of the four ground wheels 48 is mounted on a short axle 50 that extends rigidly from the corresponding crank arm.

FIG. 5 shows a landing gear structure which is largely identical with the previously described structure, as indicated by the use of corresponding numerals to indicate corresponding parts. The landing gear shown in FIG. 5 has two brake means 45 instead of one brake means on each of the two transverse torsion rods 26 and 36. Another modification of this embodiment is the provision of suitable shock absorber means. In the construction shown each of the four brackets 24a and 25a comprises two convergent arms in the form of conventional shock absorbers 52. In addition the oscillations of each of the four cranks 38 are damped by a corresponding shock absorber 53 that is connected between the crank arm and the fuselage or body of the aircraft. Such damping means are not required for a helicopter that has a rigid or semi-rigid rotor. If the helicopter has an articulated rotor incorporating lag hinges, however, damping means is desirable in the landing gear to combat so-called ground resonance.

The embodiment of the landing gear shown in FIG. 6 is largely identical with the landing gear shown in FIG. 5 as indicated by the use of corresponding numerals to indicate corresponding parts. The departure from the construction shown in FIG. 5 consists in use of hydraulic locking means to releasably immobilize a torsion rod. In FIG. 6 a rocker arm 54 rigidly mounted on the forward torsion rod 26 is pivotally connected to a piston rod 55 that extends from a hydraulic cylinder 56. The hydraulic cylinder 56 is connected by a pivot 58 to a fixed structure 60 on the underside of the aircraft. The opposite ends of the hydraulic cylinder 56 are connected by two hoses 62 to a valve 64 that is electrically controlled by a push button switch 65.

When the push button switch 65 is depressed by the pilot, the valve 64 provides free communication between the two hoses 62 and thereby permits the piston rod 55 to extend and retract freely. When the landing gear makes contact with the ground and automatically accommodates itself to the contour of the ground, the push button switch 65 is released by the pilot to cut off fluid flow between the two hoses 62 thereby to lock the piston rod hydraulically to immobilize the torsion rod 26.

In the various forms of the landing gear described to this point that incorporate a pair of skids the weight of the aircraft is distributed differently to the two skids because the two brackets 24 and 25 of the right hand skid 22 are positioned forwardly relative to the corresponding brackets 24 and 25 on the left hand skid 20. Thus the weight of the aircraft is imposed on a relatively forward region of the right hand skid 22 and is imposed on a relatively rearward region of the left hand skid 20. FIG. 7 shows how a landing gear of the character described may be constructed for transmitting the load of the aircraft to the two skids in a more balanced manner.

In FIG. 7 a left hand skid 70 and a right hand skid 72 are each equipped with a forward bracket 74 and a rearward bracket 75, the two skids being identical with respect to the locations of the two brackets. A forward torsion rod 76 has a rearwardly extending left hand crank arm 78 and a forwardly extending right hand crank arm 80, the two crank arms being connected to the two corresponding forward brackets 74 by suitable pivot means 82. The torsion rod 76 is journalled in a pair of bearings 84 and is provided with brake means 85 for releasably engaging a disk 86 on the torsion rod.

In like manner a rearward torsion rod 88 journalled in a pair of bearings 90 has a forwardly extending right hand crank arm 92 and a rearwardly extending left hand crank arm 94, the two crank arms being connected to the corresponding brackets 75 by suitable pivot means 95. The rearward torsion rod 88 is also equipped with brake means 85 for releasable engagement with a disk 86 on the torsion rod.

It is to be noted that in FIG. 7 the two parallel torsion rods 76 and 88 are not perpendicular to the two skids 70 and 72 but are inclined away from perpendicular. The four crank arms are parallel, all having planes of rotation at acute angles to the two skids 70 and 72. Accordingly the pivot means 82 and 95 that connect the four crank arms to the four brackets have axes parallel to the torsion rods.

FIG. 8 illustrates an arrangement whereby a torsion rod may be immobilized automatically in response to the transmission of a predetermined load to the torsion rod by the aircraft. In FIG. 8 a torsion rod 100 journalled in a pair of bearings 102 has a rearwardly extending left hand crank arm 104 pivotally connected to a bracket 105 of a left hand skid and has a forwardly extending right hand crank arm 106 connected to a similar bracket 105 of a right hand skid, neither skid being shown. The torsion rod 100 is normally free to rotate but may be immobilized by a pair of brake means 108 adapted for releasable engagement with corresponding disks 110 on the torsion rod.

Each of the two brake means 108 is electro-responsive for control by a suitable circuit which includes a normally open micro-switch 112. The micro-switch 112 has an operating member 114 which is responsive to the flexure of the torsion rod 100 when a load of predetermined magnitude is imposed on the torsion rod. Normally, i.e. when the weight of the aircraft is not imposed on the two bearings 102 the torsion rod 100 is straight as shown in solid lines in FIG. 8. When the weight of the aircraft is imposed on the two bearings 102 the torsion rod is centrally bowed downward as shown in broken lines and the switch 112 responds by applying the two brake means 108 to immobilize the torsion rod. It is apparent that the immobilizing means is controlled by slight relative movement between the aircraft and the landing gear.

FIGS. 9 and 10 show an arrangement for automatic operation on the same principle in which lost motion is provided in connection between the aircraft and the landing gear. In FIGS. 9 and 10 a torsion rod 115 carrying the usual oppositely directed crank arms 116 and 118 is journalled in bearing sleeves 120 in a pair of corresponding bearing blocks 122 on opposite sides of the aircraft. Each of the bearing blocks 122 is slidingly mounted in a vertical guideway 124 of a corresponding bracket 125 that is rigidly mounted on the underside of the aircraft. Each bearing block 122 is urged towards its lowermost position by a confined coiled compression spring 126 which yields when a predetermined portion of the weight of the aircraft is imposed on the landing gear.

The torsion rod 115 carries two disks 128 having tapered peripheral edges for cooperation with two corresponding brake blocks 130 that are fixedly mounted on the underside of the aircraft. Normally, i.e. when the weight of the aircraft is not imposed on the landing gear, the two springs 126 maintain the torsion rod 115 in position with the two disks 128 free to rotate relative to the brake blocks 130 and the landing gear is free to accommodate itself to the contour of the terrain as the pilot makes a landing. The weight of the aircraft is then transmitted to the landing gear by engagement of the brake blocks 130 with the disks 128 with consequent automatic immobilization of the torsion rod 115.

FIG. 11 shows another arrangement for utilizing the lost motion between the aircraft and the landing gear. Here again a torsion rod 132 carrying the usual oppositely directed crank arms 134 and 135 is journalled in previously described spring loaded bearing blocks 122 in fixed brackets 125 on the underside of the aircraft. The torsion rod 132 fixedly carries a central disk 136 and slidingly carries a pair of collars 138 with brake faces 140 for frictionally engaging the opposite faces of the central disk. Each of the collars 138 is restrained from rotation by suitable means (not shown) and is controlled by a corresponding link 142, the link being connected to the collar by a pivot 144 and being connected to the aircraft by a second pivot 45. When the weight of the aircraft is transferred to the landing gear in the course of making a landing the aircraft settles slightly by compression of the previously described coiled springs 126 with the consequence that the two toggle links 142 press the two brake faces 140 against the opposite sides of the central disk 136 to immobilize the torsion rod 132.

In the embodiment of the invention shown in FIG. 12 the landing gear includes a left hand skid 180 and a right hand skid 182, each of which has an upstanding forward bracket 184 and an upstanding rearward bracket 185. A first forward torsion rod 186 that is suitably journalled on the underside of the aircraft fixedly carries a forwardly extending crank arm 188 that is pivotally connected to the forward bracket 184 on the left hand skid 180 and a second forward torsion rod 190 coaxially aligned with the torsion rod 186 fixedly carries a forwardly extending crank arm 192 that is pivotally connected to the forward bracket 184 of the right hand skid 182. The inner ends of the two forward torsion rods 186 and 190 have corresponding bevel gears 194 in mesh with a third bevel gear 195 on a longitudinal shaft 196.

In like manner a first rearward torsion rod 198 that is suitably journalled on the underside of the aircraft fixedly carries a forwardly extending crank arm 200 that is pivotally connected to the rearward bracket 185 of the left hand skid 180 and a second rearward torsion rod 202 that is in coaxial alignment with the torsion rod 198 fixedly carries a forwardly extending crank arm 204 that is pivotally connected to the rearward bracket 185 of the right hand skid 182. The inner ends of the two torsion rods 198 and 202 carry corresponding bevel gears 205 that mesh with a third bevel gear 206 on the previously mentioned longitudinal shaft 196. The longitudinal shaft 196 may be immobilized by brake means 208 of any suitable construction mounted on the underside of the aircraft and controlled in the usual manner by a normally open push button switch 209.

It is apparent that since the two torsion rods of each of the two pairs of axially aligned torsion rods are interconnected by three bevel gears, the two torsion rods will rotate in opposite directions. It is also apparent that the two pairs of torsion rods will rotate in unison since they are interconnected by the longitudinal shaft 196. Thus if the two right hand crank arms 192 and 204 are elevated by contact of the skid 182 with the ground while the pilot is pressing the push button switch 209 the two left hand crank arms 188 and 200 are correspondingly swung downward to lower the left hand skid 180. When the landing gear has adapted itself to the terrain, the pilot releases the push button switch 109 to operate the brake means 208 to immobilize the two pairs of torsion rods.

The embodiment of the invention shown in FIG. 13 is largely identical with the embodiment shown in FIG. 12 as indicated by the use of corresponding numerals to indicate corresponding parts. In this instance, however, the two bevel gears 195 and 206 are independent of each other, the two bevel gears being mounted on separate stub shafts 210 respectively journalled in corresponding bearings 212. Each of the four torsion rods 186, 190, 198 and 202 fixedly carries a corresponding disk 214 for cooperation with a corresponding brake means 215. This arrangement permits the two pairs of torsion rods to operate independently to permit one skid to be tilted relative to the other, for example, when the forward end of one skid rests on a rock. When the landing gear accommodates itself to the terrain in the course of a landing, the four brake means 215 are operated to immobilize the four torsion rods.

My description in specific detail of the selected embodiments of the invention will suggest various changes, substitutions and other departures from my disclosure within the spirit and scope of the appended claims.

I claim:

1. In a landing gear for a hovering type aircraft, the combination of:
   two ground contact means on the opposite sides respectively of the aircraft to support the aircraft on the ground;
   first arm means pivotally mounted on one side of the aircraft and extending forwardly of the aircraft, said arm means being connected to the corresponding ground contact means on the same side of the aircraft to raise and lower the ground contact means relative to the aircraft;
   second arm means pivotally mounted on the other side of the aircraft and extending rearwardly thereof, said second arm means being connected to the corresponding ground contact means on the same side of the aircraft to raise and lower the ground contact means relative to the aircraft;
   rotary means integrally interconnecting the two arm means for rotation therewith; and
   means to immobilize said rotary interconnecting means thereby to immobilize said two arm means.

2. A combination as set forth in claim 1 in which said interconnecting means is a transverse torsion rod.

3. A combination as set forth in claim 2 in which said torsion rod is journalled on the aircraft and said two arm means are crank arms fixedly mounted on the opposite ends of the torsion rod.

4. In a landing gear for a hovering type aircraft, the combination of:
   two ground contact means on the opposite sides respectively of the aircraft to support the aircraft on the ground;
   two crank members on the opposite sides respectively of the aircraft connected to said ground contact means respectively, one of said crank members extending forwardly and the other of the crank members extending rearwardly;
   rotary transverse shaft means operatively interconnecting the two crank members to either lower crank member in response to rise of the other crank member, to permit the two ground contact means to be adjusted freely by contact with the ground; and
   brake means to immobilize said shaft means thereby to immobilize the two ground contact means at their adjusted positions.

5. A combination as set forth in claim 4 in which said brake means is responsive to the imposition of the weight of the aircraft on the two ground contact means.

6. A combination as set forth in claim 4 in which said brake means is hydraulic lock means.

7. In a landing gear for a hovering type aircraft, the combination of:
   two longitudinal ground contact means on the opposite sides respectively of the aircraft;
   two pairs of cranks on the opposite sides respectively of the aircraft, the two cranks of each pair extending in the same direction longitudinally of the aircraft and being spaced apart longitudinally of the aircraft, said two pairs of cranks being connected to said two ground contact means respectively to raise and lower the two ground contact means relative to the aircraft, the cranks on the opposite sides of the aircraft extending in opposite longitudinal directions;
   a torsion rod operatively interconnecting the two forward cranks on the opposite sides of the aircraft in opposite respects to cause either crank to swing downward in response to upward swing of the other;
   a torsion rod operatively interconnecting the two rearward cranks on the opposite sides of the aircraft in opposite respects to cause either crank to swing downward in response to upward swing of the other; and
   means to releasably immobilize said torsion rods.

8. In a landing gear for a hovering type aircraft, the combination of:
   a landing assembly comprising two ground contact means on opposite sides respectively of the aircraft and means including a rotary means operatively interconnecting the two ground contact means to cause either to lower in response to raising the other;
   means connecting said assembly to the aircraft to support the aircraft on the ground;
   said connecting means permitting slight relative vertical movement between the aircraft and the assembly; and
   means responsive to said relative vertical movement to immobilize said rotary means thereby to immobilize said ground contact means relative to the aircraft when the aircraft weight is imposed on the assembly.

9. A combination as set forth in claim 8 in which said immobilizing means comprises brake means to engage said rotary means and means pivotally connected to the aircraft and interconnecting said brake means and the aircraft to actuate the brake in response to said relative vertical movement.

10. A combination as set forth in claim 9 in which said brake means comprises two engagement members on opposite sides of the rotary means; and
    in which said brake-actuating means comprises two toggle links to operate said two engagement members respectively.

11. In a landing gear for a hovering type aircraft, the combination of:
    two extensible and retractible ground contact means on the opposite sides respectively of the aircraft and attached to the aircraft to support the aircraft on the ground;
    means interconnecting the two ground contact means for extension and retraction in opposite respects so that upward retraction of one of the two ground contact means causes corresponding downward extension of the other of the two ground contact means, whereby the two ground contact means may be adjusted to support the aircraft on uneven ground by lowering the aircraft under lift power with the two ground contact means free to extend and retract until both of the two ground contact means impinge on the uneven ground;
    means normally locking the two ground contact means against extension and retraction; and remote control means manually operable by the pilot of the aircraft to temporarily release the locking means.

12. In a landing gear for a hovering aircraft, the combination of:

two extensible and retractible ground contact means on the opposite sides respectively of the aircraft and attached to the aircraft to support the aircraft on the ground;

means interconnecting the two ground contact means for extension and retraction in opposite respects whereby upward retraction of one of the two ground contact means causes corresponding downward extension of the other of the two ground contact means, whereby the two ground contact means may be adjusted to support the aircraft on uneven ground by lowering the aircraft under lift power with the two ground contact means free to extend and retract until both of the two contact means impinge on the uneven ground;

means normally locking the ground contact means against extension and retraction;

electro-responsive means to unlock said locking means; and a manually operable switch on a manual flight control member of the aircraft for operation by the pilot to energize said electro-responsive means temporarily in the course of a landing maneuver to permit the two ground contact means to accommodate themselves to uneven ground.

References Cited in the file of this patent

UNITED STATES PATENTS

| | | |
|---|---|---|
| 2,923,501 | Seliger | Feb. 2, 1960 |
| 2,933,270 | Maltby | Apr. 19, 1960 |
| 2,933,271 | Maltby | Apr. 19, 1960 |
| 3,002,711 | Stefano | Oct. 3, 1961 |